US010782568B2

(12) United States Patent
Lv et al.

(10) Patent No.: US 10,782,568 B2
(45) Date of Patent: Sep. 22, 2020

(54) ALIGNMENT METHOD OF LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Xiaowen Lv, Guangdong (CN); Pojen Chiang, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 343 days.

(21) Appl. No.: 15/748,568

(22) PCT Filed: Jan. 4, 2018

(86) PCT No.: PCT/CN2018/071380
§ 371 (c)(1),
(2) Date: Jan. 29, 2018

(87) PCT Pub. No.: WO2019/127635
PCT Pub. Date: Jul. 4, 2019

(65) Prior Publication Data
US 2020/0089062 A1 Mar. 19, 2020

(30) Foreign Application Priority Data

Dec. 29, 2017 (CN) .......................... 2017 1 1486886

(51) Int. Cl.
*G02F 1/1337* (2006.01)
*G02F 1/1333* (2006.01)
*G02F 1/1335* (2006.01)
*G02F 1/1341* (2006.01)
*G02F 1/1343* (2006.01)
*G02F 1/1362* (2006.01)

(52) U.S. Cl.
CPC ...... *G02F 1/133788* (2013.01); *G02F 1/1341* (2013.01); *G02F 1/133308* (2013.01); *G02F 1/133514* (2013.01); *G02F 1/134309* (2013.01); *G02F 1/136286* (2013.01); *G02F 2001/133325* (2013.01); *G02F 2001/133742* (2013.01); *G02F 2001/133749* (2013.01)

(58) Field of Classification Search
CPC ......... G02F 1/133788; G02F 1/136286; G02F 1/134309; G02F 1/133308; G02F 1/133514; G02F 1/1341; G02F 2001/133325; G02F 2001/133742; G02F 2001/133749
See application file for complete search history.

(56) References Cited

U.S. PATENT DOCUMENTS

| 2008/0002126 A1* | 1/2008 | Lim | G02F 1/134309 349/141 |
| 2015/0153619 A1* | 6/2015 | Murata | G02F 1/1337 349/123 |
| 2017/0158715 A1* | 6/2017 | Lan | C09K 19/56 |

FOREIGN PATENT DOCUMENTS

CN 106773330 A 5/2017

* cited by examiner

*Primary Examiner* — Donald L Raleigh
(74) *Attorney, Agent, or Firm* — Hemisphere Law, PLLC; Zhigang Ma

(57) ABSTRACT

The invention discloses an alignment method of a liquid crystal display panel including the following steps: assembling a color filter substrate, an array substrate and a liquid crystal layer into a liquid crystal display panel; applying a first alignment voltage to a common electrode line layer of the array substrate, applying a second alignment voltage to a common electrode layer of the color filter substrate, and a predetermined voltage difference existed between the first alignment voltage and the second alignment voltage; performing alignment to the liquid crystal layer of the liquid crystal display panel by the predetermined voltage difference, to make liquid crystal molecules in the liquid crystal layer arranged with a preset tilt angle; and irradiating the liquid crystal layer with an ultraviolet ray. The effect of alignment can be improved, the dependence of liquid crystal alignment on the data line can be reduced, and improves the product yield.

10 Claims, 4 Drawing Sheets

ALIGNMENT METHOD OF LIQUID CRYSTAL DISPLAY PANEL

RELATED APPLICATIONS

The present application is a National Phase of International Application Number PCT/CN2018/071380, filed Jan. 4, 2018, and claims the priority of China Application No. 201711486886.5, filed Dec. 29, 2017.

FIELD OF THE DISCLOSURE

The disclosure relates to a display technical field, and more particularly to an alignment method of liquid crystal display panel.

BACKGROUND

HVA (High Vertical Alignment) display with its wide viewing angle, high contrast and no need for frictional alignment and other advantages is became one of the most commonly used technology in the large-size TV TFT-LCD.

With the increasing popularity of liquid crystal display, the display performance of liquid crystal display has also been put forward higher and higher requirements. The tolerance for poor display is getting lower and lower, of which the point line defect is the most intolerable defect, especially line defect, are generally scrapped.

Therefore, the general design will take into account the point line defect to be repaired. In the design will take into account the disconnection repair for data line, repair success can greatly improve the product yield, to reduce production costs, and improve product competitiveness. The specific repair method is the preset repair line, when the disconnection defect is happened; the lower end line is connected to the repair line, and is connected to the upper repair line by the winding line to complete repairing of the disconnection of the data line.

However, the existing HVA products generally use the pressure difference between the pixel electrode (RGB) and the common voltage (CF Com) of the CF substrate above to perform the alignment of the panel; such kind of the existing alignment method has a disadvantage, if in the time performing alignment, the data line (Data) is presented with disconnection, the pixel electrode cannot obtain the normal voltage at the disconnection site, so the alignment cannot be normally achieved at this disconnection site. Even using the above method to complete the repair of the data line following, however, due to poor liquid crystal alignment here, the display will still appear abnormal, reducing product yield.

SUMMARY

The technical problem to be solved by the present invention is to provide an alignment method of a liquid crystal display panel, which can improve the alignment effect and reduce the dependence on the data lines of the liquid crystal alignment process, thereby improving the product yield.

In order to solve the above technical problem, an aspect of an embodiment of the present invention provides an alignment method of a liquid crystal display panel, including the following steps:

Assembling a color filter substrate, an array substrate and a liquid crystal layer into a liquid crystal display panel;

Applying a first alignment voltage to a common electrode line layer of the array substrate, applying a second alignment voltage to a common electrode layer of the color filter substrate, and a predetermined voltage difference existed between the first alignment voltage and the second alignment voltage;

Performing alignment to the liquid crystal layer of the liquid crystal display panel by the predetermined voltage difference, to make liquid crystal molecules in the liquid crystal layer arranged with a preset tilt angle; and Irradiating the liquid crystal layer with an ultraviolet ray.

Wherein the step of assembling the color filter substrate, the array substrate and the liquid crystal layer into the liquid crystal display panel specifically includes:

Providing the color filter substrate, forming at least the common electrode layer and a first alignment film layer on the color filter substrate;

Providing the array substrate, forming at least the common electrode line layer, a pixel electrode layer and a second alignment film layer on the array substrate, wherein common electrode lines are disposed on the common electrode line layer;

Coating the frame glue on the color filter substrate and the array substrate;

Filing molecules in a region surrounded by the frame glue to form the liquid crystal layer; and Wherein the common electrode lines of the array substrate are in a mesh structure and the common electrode layer of the color filter substrate is a layered structure.

Wherein pairing the color filter substrate and the array substrate to form the cartridge, an overlapping area of a region covered by the common electrode lines of the array substrate and the common electrode layer of the color filter substrate is greater than or equal to the area of the liquid crystal layer.

Wherein the step of performing alignment to the liquid crystal layer of the liquid crystal display panel by the predetermined voltage difference, to make liquid crystal molecules in the liquid crystal layer arranged with a preset tilt angle specifically includes:

Providing a vertical electric field between the color filter substrate and the array substrate by the predetermined voltage difference, to make the pretilt angle of the liquid crystal molecules of the liquid crystal layer reaching 0 degree.

Wherein after the alignment is completed, further includes the following step:

Removing the first alignment voltage applied to the common electrode line of the array substrate, and removing the second alignment voltage applied to the common electrode layer of the color filter substrate.

Accordingly, in another aspect of the embodiments of the present invention, there is further provided an alignment method of a liquid crystal display panel including the following steps:

Assembling a color filter substrate, an array substrate and a liquid crystal layer into a liquid crystal display panel;

Applying a first alignment voltage to a common electrode line layer of the array substrate, applying a second alignment voltage to a common electrode layer of the color filter substrate, and a predetermined voltage difference existed between the first alignment voltage and the second alignment voltage, wherein the common electrode lines of the array substrate are in a mesh structure and the common electrode layer of the color filter substrate is a layered structure.

Performing alignment to the liquid crystal layer of the liquid crystal display panel by the predetermined voltage difference, to make liquid crystal molecules in the liquid crystal layer arranged with a preset tilt angle; and Irradiating the liquid crystal layer with an ultraviolet ray.

Wherein pairing the color filter substrate and the array substrate to form the cartridge, an overlapping area of a region covered by the common electrode lines of the array substrate and the common electrode layer of the color filter substrate is greater than or equal to the area of the liquid crystal layer.

Wherein the step of performing alignment to the liquid crystal layer of the liquid crystal display panel by the predetermined voltage difference, to make liquid crystal molecules in the liquid crystal layer arranged with a preset tilt angle specifically includes:

Providing a vertical electric field between the color filter substrate and the array substrate by the predetermined voltage difference, to make the pretilt angle of the liquid crystal molecules of the liquid crystal layer reaching 0 degree.

Wherein after the alignment is completed, further includes the following step:

Removing the first alignment voltage applied to the common electrode line of the array substrate, and removing the second alignment voltage applied to the common electrode layer of the color filter substrate. The implementation of the embodiments of the present invention has the following beneficial effects:

The present invention provides an alignment method of a liquid crystal display panel. During alignment, the liquid crystal layer in the liquid crystal panel is aligned by utilizing the voltage difference between the common electrode line layer of the array substrate and the common electrode layer of the color filter substrate. Since the common electrode line layer of the array substrate is the mesh structure, the common electrode layer of the color filter substrate is a layered structure, both of which are integral structures, and can improve the alignment effect, no longer depend on the data line as in the prior art, even if some data lines in the pixel electrode are damaged, the alignment of the liquid crystal can still be completed, thereby improving the product yield.

BRIEF DESCRIPTION OF THE DRAWINGS

To describe the technical solutions in the embodiments of the present invention or in the conventional technology more clearly, the following briefly introduces the accompanying drawings required for describing the embodiments or the conventional technology. Apparently, the accompanying drawings in the following description merely show some embodiments of the present invention. For those skilled in the art, other drawings may be obtained based on these drawings without any creative work.

DETAILED DESCRIPTION OF PREFERRED EMBODIMENTS

Figure 1:
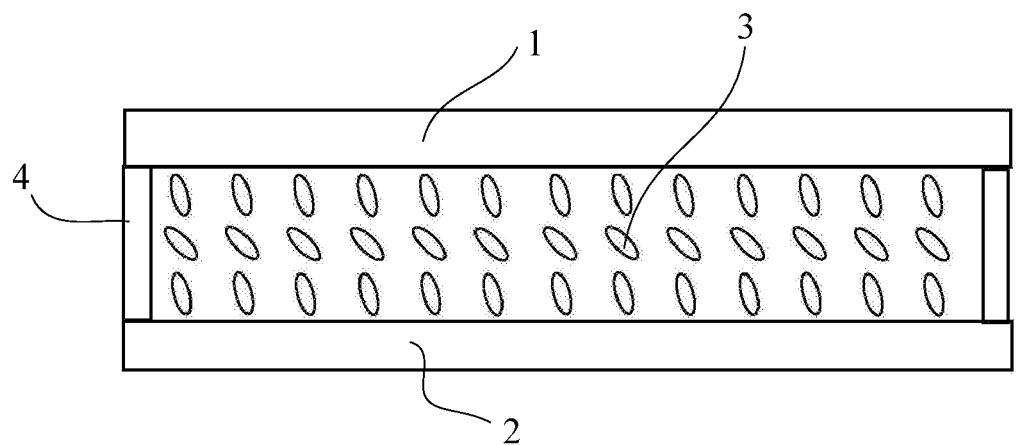
FIG. 1 is a schematic structural view of an alignment method of a liquid crystal display panel according to an embodiment of a liquid crystal display panel of the present invention.

The technical solutions in the embodiments of the present invention will be described clearly and completely below with reference to the accompanying drawings in the embodiments of the present invention. Apparently, the described embodiments are merely some but not all embodiments of the present invention. All other embodiments obtained by a person of ordinary skill in the art based on the embodiments of the present invention without creative efforts shall fall within the protection scope of the present invention.

Here, it should also be noted that in order to avoid obscuring the present invention by unnecessary details, only the structures and/or processing steps that are closely related to the solutions according to the present invention are shown in the drawings, other details of the invention are of little relevance.

As shown in FIG. 1, FIG. 1 is a schematic structural view of an alignment method of a liquid crystal display panel according to an embodiment of a liquid crystal display panel of the present invention; combining referring to FIG. 2 to FIG. 5. In this embodiment, the liquid crystal display panel at least includes a color filter substrate 1, an array substrate 2, and a liquid crystal layer 3 located between the color filter substrate 1 and the array substrate 2, a frame glue is disposed outside the liquid crystal layer 3.

Figure 2:
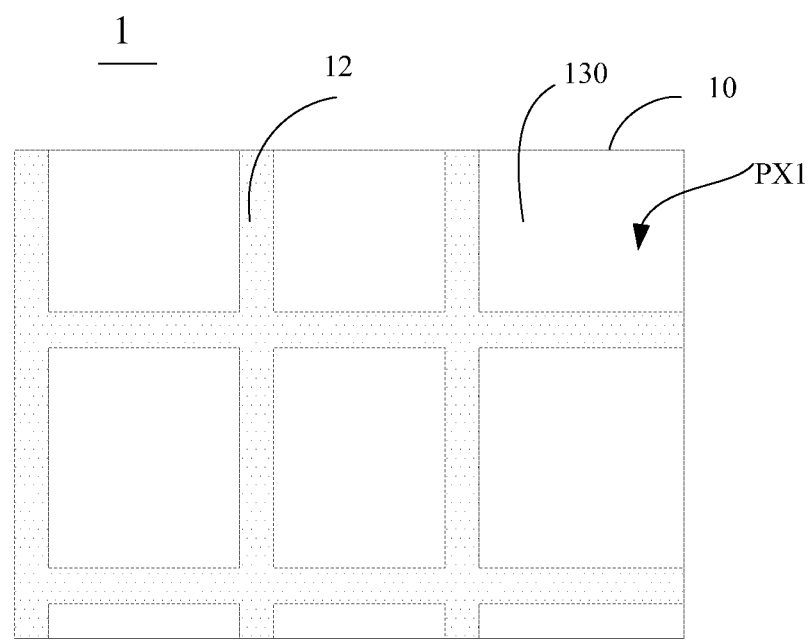
FIG. 2 is a schematic plan view of the color filter substrate illustrated in FIG. 1.
Figure 3:
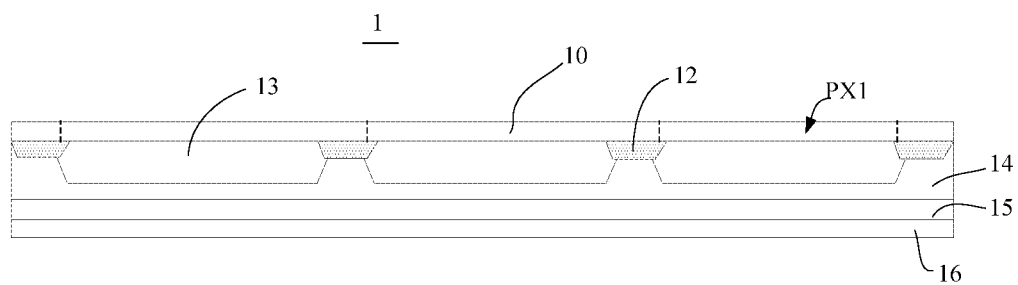
FIG. 3 is a side view of the color filter substrate illustrated in FIG. 2.

FIG. 2 is a schematic plan view of the color filter substrate illustrated in FIG. 1, combining referring to FIG. 3. Wherein, the color filter substrate 1 includes a first substrate 10, a black matrix 12, a plurality of color resist blocks 13, a first insulating layer 14, a common electrode layer 15, and a first alignment film layer 16.

The first substrate 10 may be, for example, a transparent glass substrate or a resin substrate, but the present invention is not limited thereto.

The Black matrix 12 is disposed on the first substrate 10 and defines a plurality of first pixel regions PX1. The first pixel regions PX1 are arranged in an array.

A plurality of color resist blocks 13 are disposed on the first substrate 10, and each color resist block 130 is located in a corresponding one of the first pixel regions PX1. In the present embodiment, the color resist block 130 is a red color resist block or a green color resist block or a blue color resist block. However, the present invention is not limited thereto. For example, the color resist block 130 may be any color resist block with suitable color such as white. The plurality of color resist blocks 13 includes a red color resist block, a green color resist block, and a blue color resist block. In this embodiment, the red color resist block, green color resist block, and blue color resist block may be used to as a color resist block unit for an array arrangement.

The first insulating layer 14 is disposed on the black matrix 12 and the plurality of color resist blocks 13. The first insulating layer 14 may be formed of an inorganic insulating material or an organic insulating material.

The common electrode layer 15 is disposed on the first insulating layer 14, and is a layered structure. As an embodiment of the present invention, the common electrode layer 15 may be formed of one or more of indium tin oxide, indium zinc oxide, aluminum tin oxide, aluminum zinc oxide and indium germanium zinc oxide, but the present invention is not limited thereto.

The first alignment film layer 16 is disposed on the common electrode layer 15. As an embodiment of the present invention, the first alignment film layer 160 is formed of polyimide (PI), but the present invention is not limited thereto.

It is understood that, the first insulating layer 14, the common electrode layer 15 and the first alignment film layer 16 are not shown in FIG. 2 in order to facilitate the arrangement of the black matrix 12 and the color resist block 13.

Figure 4:
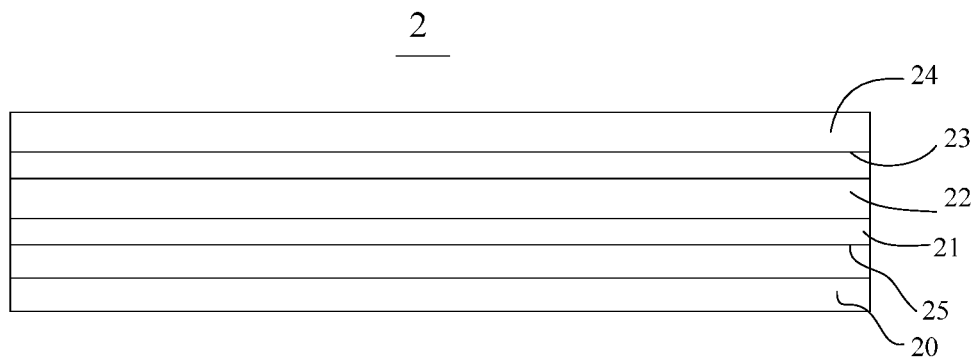
FIG. 4 is a schematic side view of the array substrate illustrated in FIG. 1.
Figure 5:
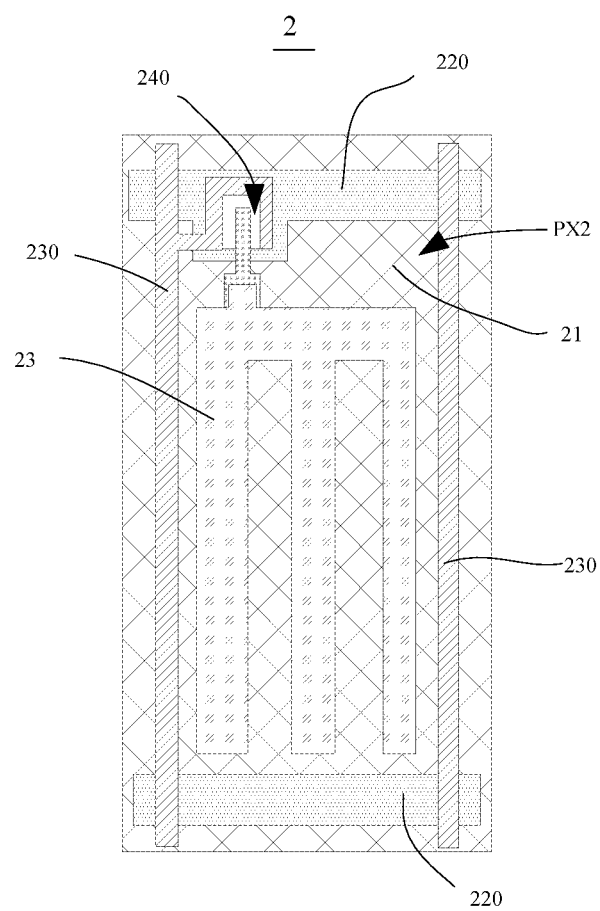
FIG. 5 is a top schematic view of one pixel region of the array substrate illustrated in FIG. 1.

FIG. 4 is a side view of an array substrate according to an embodiment of the present invention. FIG. 5 is a schematic top view of one pixel unit region. Wherein, the array substrate 2 includes: a second substrate 20, a TFT layer 25, a common electrode line layer 21, an insulation protection layer 22, a pixel electrode layer 23, and a second alignment film layer 24.

Wherein, the second substrate 20 may be, for example, a transparent glass substrate or a resin substrate, but the present invention is not limited thereto.

Wherein, in the TFT layer 25 are defined with a plurality of scan lines 220 and a plurality of data lines 230 and insulated from each other, so as to define a plurality of second pixel regions PX2. After the array substrate 2 and the color filter substrate 1 are assembled to the cartridge, each of the second pixel region PX2 corresponds to each of the first pixel region PX1.

At least one switching unit 240 is disposed in each second pixel region PX2 of the TFT layer 25, and the switching unit 240 includes such as a gate, a gate insulating layer, an active layer, a source and a drain, wherein the source and the drain are respectively in contact with the two ends of the semi-active layer.

An insulating protection layer 22 is formed on the TFT layer 25. A via hole is formed on the insulation protection layer 22 corresponding to the drain.

The pixel electrode layer 23 and the common electrode line layer 21 are formed on the insulating protective layer 22, wherein the pixel electrode 23 is in contact with the drain of the TFT layer through the via hole. Wherein, the common electrode line layer 21 is disposed with a common electrode line, the common electrode line is a mesh structure, and is insulated from the pixel electrode layer 23.

The pixel electrode layer 23 can be made of one or more of indium tin oxide, indium zinc oxide, aluminum tin oxide, aluminum zinc oxide and indium zinc germanium oxide, but the present invention is not limited thereto.

The second alignment film 24 is formed on the pixel electrode 23, the common electrode line layer 21 and the insulation protection layer 22. As an embodiment of the present invention, the second alignment layer 24 is formed of polyimide (PI), but the present invention is not limited thereto.

Figure 6:
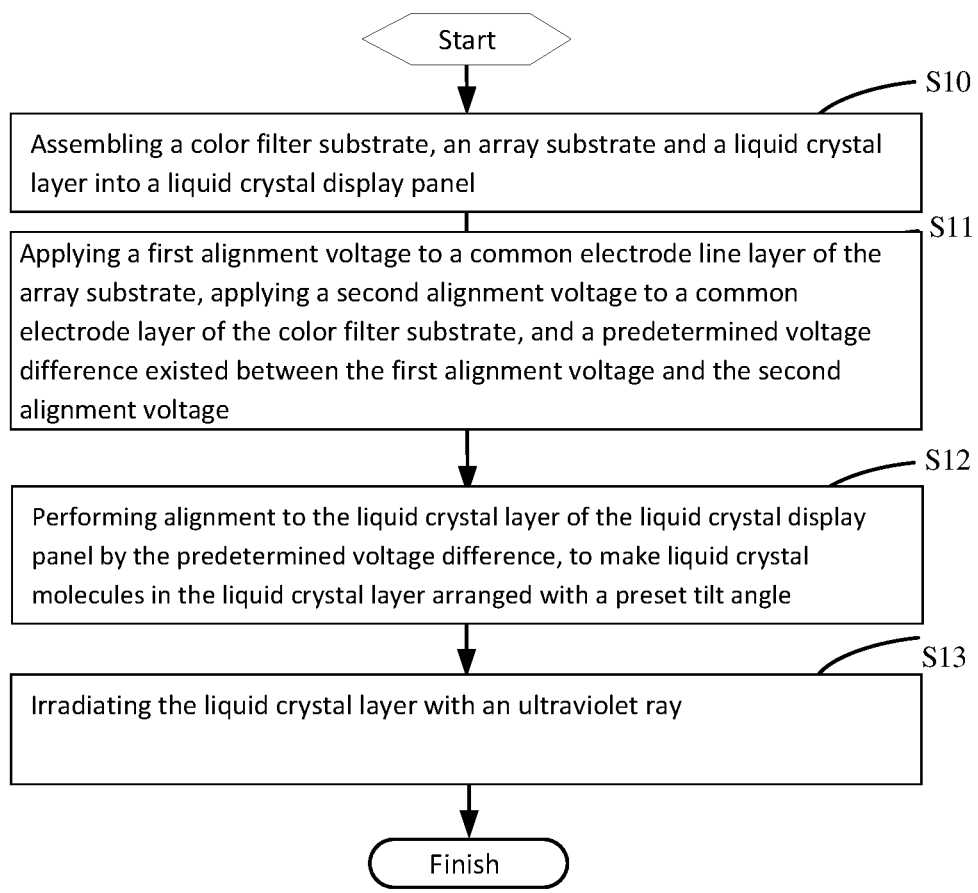
FIG. 6 is a schematic structural view of an alignment method of a liquid crystal display panel according to an embodiment of the present invention.

As shown in FIG. 6, FIG. 6 is a schematic structural view of an alignment method of a liquid crystal display panel according to an embodiment of the present invention. Combining referring to FIG. 1 to FIG. 5 described above, in this embodiment, the method includes the following steps:

Step S10, assembling the color filter substrate 1, the array substrate 2 and the liquid crystal layer 3 into a liquid crystal display panel;

Specifically, providing a color filter substrate 1, forming at least a common electrode layer 15 and a first alignment film layer 16 on the color filter substrate 1, wherein, the common electrode layer 15 of the color filter substrate 1 is a mesh structure; in one embodiment, reference may be made to the foregoing description of FIG. 2 and FIG. 3, but the present invention is not limited thereto;

Providing an array substrate 2, forming at least a common electrode line layer 21, a pixel electrode layer 23 and a second alignment film layer 24 on the array substrate 2; wherein the common electrode lines of the array substrate 2 are in a mesh structure; in one embodiment, reference may be made to the foregoing description of FIG. 4 and FIG. 5, but the present invention is not limited thereto;

Coating the frame glue 4 on the color filter substrate 1 and the array substrate 2;

Filing liquid crystal molecules in a region surrounded by the frame glue 4 to form the liquid crystal layer 3;

Pairing the color filter substrate 1 and the array substrate 2 to form a cartridge. It can be understood that, in one embodiment, after the color filter substrate 1 and the array substrate 2 are paired to form the cartridge, the overlapping area of the region covered by the common electrode lines of the array substrate 1 and the common electrode layer of the color filter substrate 2 is greater than or equal to the area of the liquid crystal layer.

Step S11, applying a first alignment voltage to the common electrode line layer 21 of the array substrate 2, and applying a second alignment voltage to the common electrode layer 15 of the color filter substrate 1. A predetermined voltage difference is existed between the first alignment voltage and the second alignment voltage, the predetermined voltage difference is selected according to the specific circumstances, such as 10V and so on;

Step S12, performing alignment to the liquid crystal layer 3 of the liquid crystal display panel by the predetermined voltage difference, to make the liquid crystal molecules in the liquid crystal layer 3 are arranged with a preset tilt angle. In an embodiment, the step S12 specifically includes:

Providing a vertical electric field between the color filter substrate 1 and the array substrate 2 by the predetermined voltage difference, to make the pretilt angle of the liquid crystal molecules of the liquid crystal layer 3 reaches 0 degree.

Step S13, irradiating the liquid crystal layer 3 with an ultraviolet ray to make it be cured.

It is understandable that, during the alignment, the pixel electrode layer 23 is not connected with any signal, and after the alignment process is completed, the following steps are included:

Removing the first alignment voltage applied to the common electrode line 21 of the array substrate 2 and removing the second alignment voltage applied to the common electrode layer 15 of the color filter substrate 1.

The implementation of the embodiments of the present invention has the following beneficial effects:

The present invention provides an alignment method of a liquid crystal display panel. During alignment, the liquid crystal layer in the liquid crystal panel is aligned by utilizing the voltage difference between the common electrode line layer of the array substrate and the common electrode layer of the color filter substrate. Since the common electrode line layer of the array substrate is the mesh structure, the common electrode layer of the color filter substrate is a layered structure, both of which are integral structures, and can improve the alignment effect, no longer depend on the data line as in the prior art, even if some data lines in the pixel electrode are damaged, the alignment of the liquid crystal can still be completed, thereby improving the product yield.

It should be noted that, in this document, relational terms such as first and second are merely used to distinguish one entity or operation from another entity or operation, and do not necessarily require or imply that the entity or operation is any such actual relationship or order between. Also, the terms "comprise," "include," or any other variations thereof are intended to cover a non-exclusive inclusion such that a process, method, article, or apparatus that includes a list of elements includes not only those elements but also those that are not explicitly listed or other elements that are inherent to such process, method, article, or device. Without further limitations, an element limited by the statement "including a . . ." does not exclude the existence of additional identical elements in the process, method, article, or apparatus that includes the element.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. An alignment method of a liquid crystal display panel comprising the following steps:
   assembling a color filter substrate, an array substrate and a liquid crystal layer into a liquid crystal display panel, wherein the color filter substrate comprises a common electrode layer and an alignment film layer disposed on the common electrode layer, the array substrate comprises a common electrode line layer, a pixel electrode layer insulated from the common electrode line layer, and another alignment film layer disposed on the common electrode line layer and the pixel electrode layer;
   applying a first alignment voltage and a second alignment voltage respectively to the common electrode line layer of the array substrate and the common electrode layer of the color filter substrate, while the pixel electrode layer being not connected with any signal, wherein a predetermined non-zero voltage difference is between the first alignment voltage and the second alignment voltage;
   performing alignment to the liquid crystal layer of the liquid crystal display panel by the predetermined voltage difference, to make liquid crystal molecules in the liquid crystal layer arranged with a preset tilt angle; and
   irradiating the liquid crystal layer with an ultraviolet ray.

2. The alignment method according to claim 1, wherein the step of assembling the color filter substrate, the array substrate and the liquid crystal layer into the liquid crystal display panel specifically comprises:
   providing the color filter substrate;
   providing the array substrate, wherein common electrode lines are disposed on the common electrode line layer;
   coating the frame glue on the color filter substrate and the array substrate;
   in a region surrounded by the frame glue to form the liquid crystal layer; and
   pairing the color filter substrate and the array substrate to form a cartridge.

3. The alignment method according to claim 2, wherein the common electrode lines of the array substrate are in a mesh structure and the common electrode layer of the color filter substrate is a layered structure.

4. The alignment method according to claim 3, wherein pairing the color filter substrate and the array substrate to form the cartridge, an overlapping area of a region covered by the common electrode lines of the array substrate and the common electrode layer of the color filter substrate is greater than or equal to the area of the liquid crystal layer.

5. The alignment method according to claim 4, wherein the step of performing alignment to the liquid crystal layer of the liquid crystal display panel by the predetermined voltage difference, to make liquid crystal molecules in the liquid crystal layer arranged with a preset tilt angle specifically comprises:
   providing a vertical electric field between the color filter substrate and the array substrate by the predetermined voltage difference, to make the pretilt angle of the liquid crystal molecules of the liquid crystal layer reach 0 degrees.

6. The alignment method according to claim 5, wherein after the alignment is completed, further comprises the following step:
   removing the first alignment voltage applied to the common electrode line of the array substrate, and removing the second alignment voltage applied to the common electrode layer of the color filter substrate.

7. An alignment method of a liquid crystal display panel comprising the following steps:
   assembling a color filter substrate, an array substrate and a liquid crystal layer into a liquid crystal display panel, wherein the color filter substrate comprises a common electrode layer and an alignment film layer disposed on the common electrode layer, the array substrate comprises a common electrode line layer, a pixel electrode layer insulated from the common electrode line layer, and another alignment film layer disposed on the common electrode line layer and the pixel electrode layer, the common electrode line layer is disposed with common electrode lines;
   applying a first alignment voltage and a second alignment voltage respectively to the common electrode line layer of the array substrate and the common electrode layer of the color filter substrate, while the pixel electrode layer being not connected with any signal, wherein a predetermined non-zero voltage difference is existed between the first alignment voltage and the second alignment voltage, wherein the common electrode lines of the array substrate are in a mesh structure and the common electrode layer of the color filter substrate is a layered structure;
   performing alignment to the liquid crystal layer of the liquid crystal display panel by the predetermined voltage difference, to make liquid crystal molecules in the liquid crystal layer arranged with a preset tilt angle; and
   irradiating the liquid crystal layer with an ultraviolet ray.

8. The alignment method according to claim 7, wherein pairing the color filter substrate and the array substrate to form the cartridge, an overlapping area of a region covered by the common electrode lines of the array substrate and the common electrode layer of the color filter substrate is greater than or equal to the area of the liquid crystal layer.

9. The alignment method according to claim 8, wherein the step of performing alignment to the liquid crystal layer of the liquid crystal display panel by the predetermined voltage difference, to make liquid crystal molecules in the liquid crystal layer arranged with a preset tilt angle specifically comprises:
   providing a vertical electric field between the color filter substrate and the array substrate by the predetermined voltage difference, to make the pretilt angle of the liquid crystal molecules of the liquid crystal layer reach 0 degrees.

10. The alignment method according to claim 9, wherein after the alignment is completed, further comprises the following step:

removing the first alignment voltage applied to the common electrode line of the array substrate, and removing the second alignment voltage applied to the common electrode layer of the color filter substrate.

\* \* \* \* \*